C. B. HODGES.
COMPOUND COMPRESSED AIR ENGINE.
APPLICATION FILED JUNE 11, 1909.

979,165.

Patented Dec. 20, 1910.

2 SHEETS—SHEET 1.

WITNESSES.
J. R. Keller
Robert C. Totten

INVENTOR.
Charles B. Hodges
By Kay & Totten
Attorneys

C. B. HODGES.
COMPOUND COMPRESSED AIR ENGINE.
APPLICATION FILED JUNE 11, 1909.
979,165.
Patented Dec. 20, 1910.
2 SHEETS—SHEET 2.
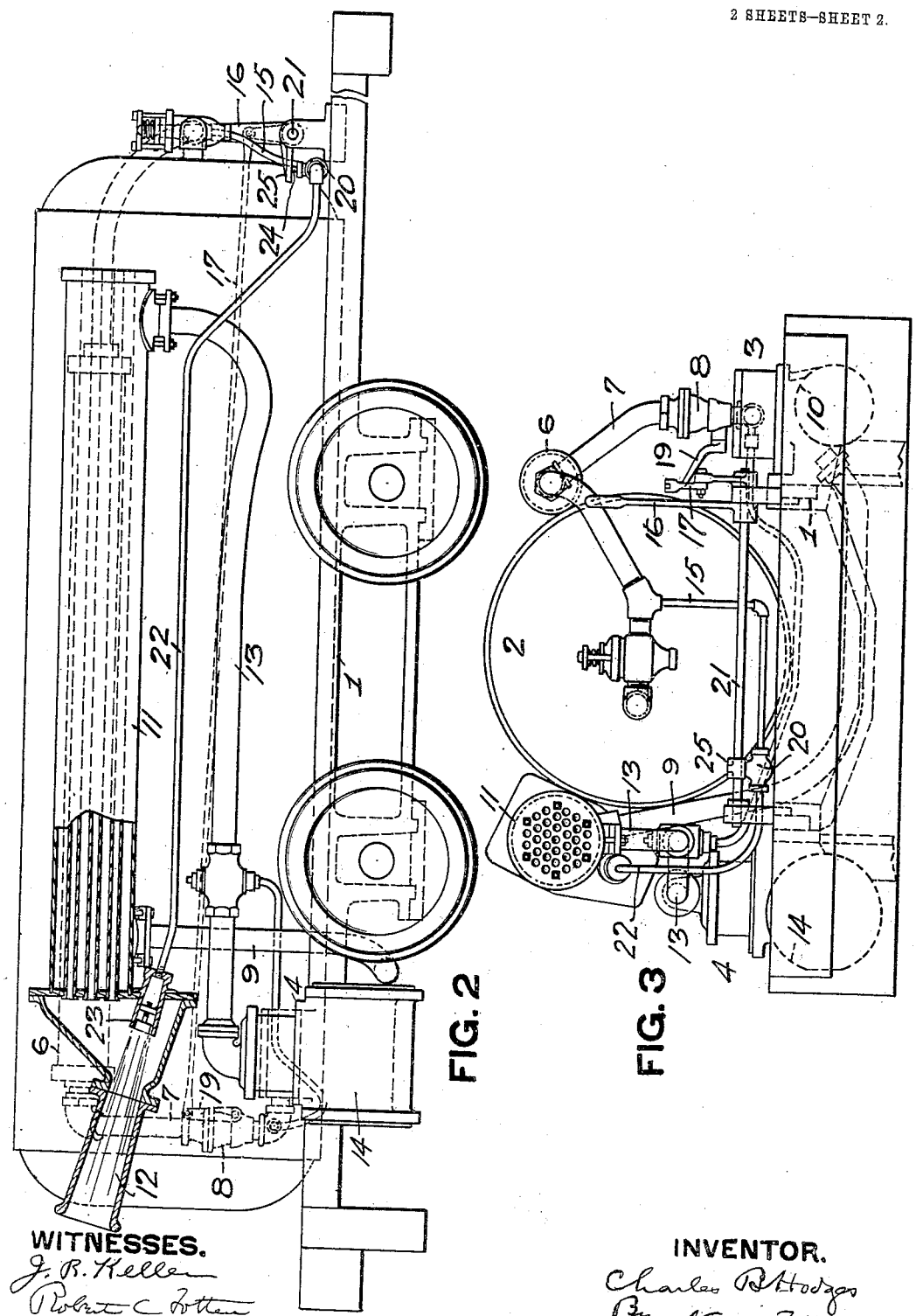
WITNESSES.
INVENTOR.

UNITED STATES PATENT OFFICE.

CHARLES B. HODGES, OF PITTSBURG, PENNSYLVANIA, ASSIGNOR TO H. K. PORTER COMPANY, OF PITTSBURG, PENNSYLVANIA, A CORPORATION OF PENNSYLVANIA.

COMPOUND COMPRESSED-AIR ENGINE.

979,165.   Specification of Letters Patent.   Patented Dec. 20, 1910.

Application filed June 11, 1909.   Serial No. 501,639.

*To all whom it may concern:*

Be it known that I, CHARLES B. HODGES, a resident of Pittsburg, in the county of Allegheny and State of Pennsylvania, have invented a new and useful Improvement in Compound Compressed-Air Engines, (Case 1;) and I do hereby declare the following to be a full, clear, and exact description thereof.

My invention relates to compound compressed air engines, its object being to provide means for carrying the air used for reheating the compressed air over the exposed surfaces of the inter-heater between the high pressure engine and the low pressure engine and to control the same in connection with the operation of the engines through its main or throttle valve.

It comprises, generally stated, in combination with a high pressure engine, a low pressure engine and the interheater between the same, of the throttle valve controlling the same, of the throttle valve controlling the supply of air to the engine, means to induce a current of atmospheric air over the surfaces of the inter-heater, a valve controlling the supply of air under pressure to induce such current, and lever mechanism controlling both the throttle valve and said current inducing valve as hereinafter described.

Figure 1:
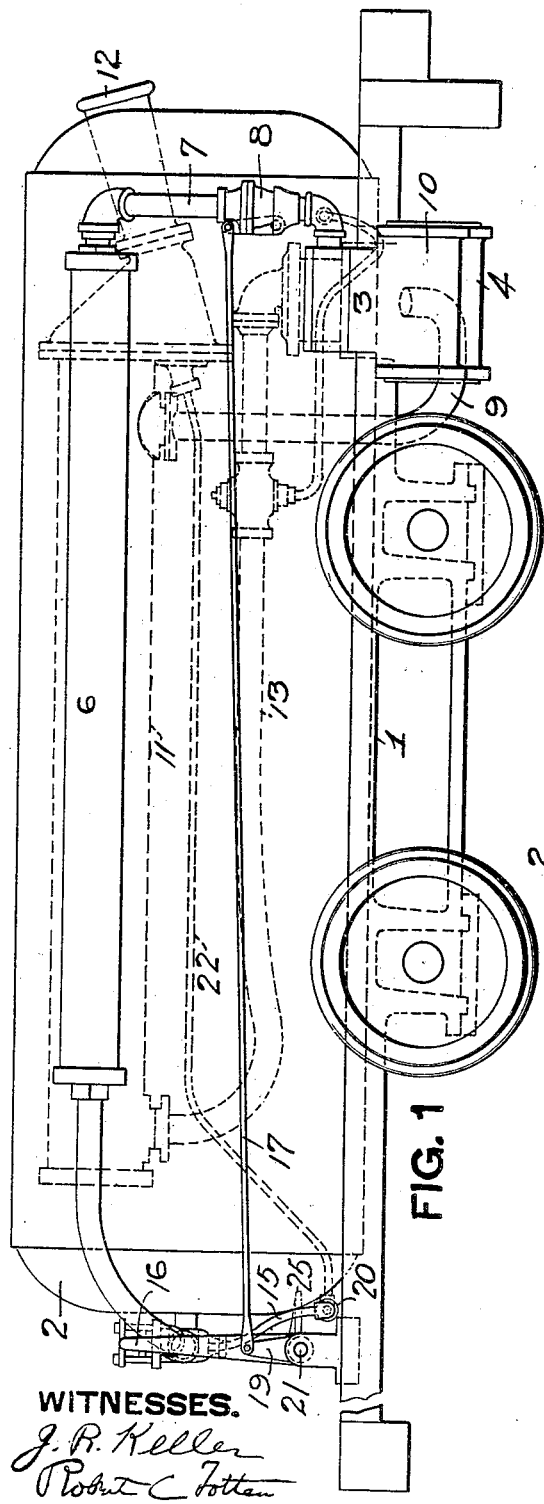
Figure 4:
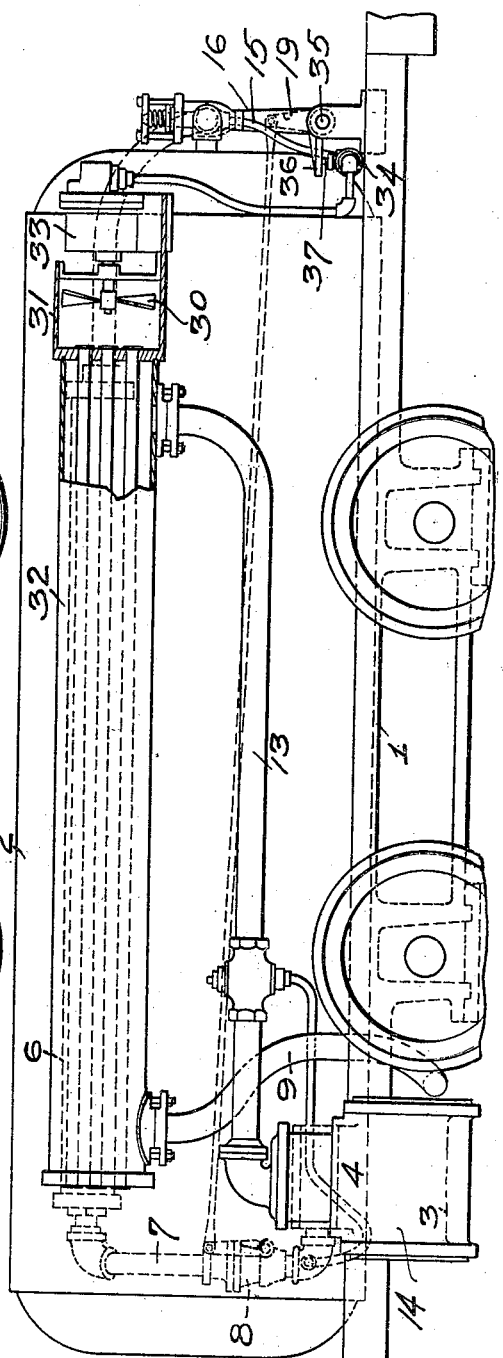

In the accompanying drawings Figure 1 is a side view of one side of a locomotive engine embodying the invention; Fig. 2 is a side view partly broken away of the other side of such engine; Fig. 3 is an end view illustrating the valve mechanism for controlling the throttle and air jet valves; and Fig. 4 is a view of a modification.

The invention as illustrated in the drawings is applied to a locomotive engine and will be described in connection with the same. The engine has the engine truck 1, the main air reservoir tank 2, the high pressure engine 3, and low pressure engine 4, said engines being connected up with the driving wheels of the locomotive. The engine is also provided with the auxiliary reservoir 6 from which air passes through the pipe 7 to the valve box of the high pressure engine, the main or throttle valve 8 being located in this pipe. The exhaust pipe 9 leads from cylinder 10 of the high pressure engine to the interheater 11 which, as shown, is supported on the main tank 2 and extends longitudinally thereof and is provided with a series of pipes extending through the same to provide an extended heating surface for the air from the high pressure cylinder, the inter-heater having also the nozzle 12 by which a strong air draft or current of air at atmospheric pressure is induced through the pipes of the inter-heater. The pipe 13 leads from the inter-heater to the valve box of the low pressure cylinder 14.

Air under pressure is supplied to the inducing nozzle 12 to cause a draft or current through the pipes of the inter-heater, such air being drawn from any suitable part of the apparatus containing air under pressure. I have illustrated this having a pipe 15 which extends from the supply pipe to the auxiliary reservoir 6 into the engineer's cab close to the throttle valve lever 16 which, as shown in Fig. 1, has the rod 17 extending to the throttle valve 8 and operating the same through the lever 19. The said pipe 15 has the air jet controlling valve 20 located close to the shaft 21 of the throttle lever 16, and the pipe 22 extending therefrom to the nozzle 12 of the inter-heater and communicating with the air jet 23 discharging into said nozzle so as to induce a draft through the inter-heater and so draw the atmospheric air over the exposed surfaces thereof, such as through the series of pipes within the inter-heater.

As shown in Fig. 3, the air jet controlling valve 20 has its valve stem 24 extending up through the valve body close to the throttle lever shaft 20, and said throttle lever shaft has the auxiliary arm 25 extending over the valve stem of said air jet valve in position to control the same, that is, to force the same to its seat when the throttle valve is closed, but to open the same when the throttle valve is opened so as to permit passage of the air under pressure through the pipe 22 to the inducing nozzle 12 of the interheater and induce the current of air through the inter-heater and so cause the reheating of the air after its passage from the high pressure cylinder to the low pressure cylinder.

In the operation of the engine the compressed air from the auxiliary reservoir 6 upon the opening up of the throttle valve passes through the high pressure cylinder and is expanded therein and in this way its temperature is lowered much below atmospheric temperature and in order to increase its volume by reheating it is carried through the interheater and while confined therein is exposed to a large amount of atmospheric air, the air for example passing through the tubes of the interheater and on account of the difference in temperature of the refrigerated and expanded air the air at atmospheric temperature acts to reheat the same and bring it back to proper volume, after which it passes through the low pressure cylinder and is expanded therein and discharged.

The throttle lever shaft is so arranged as to open the air jet valve in proportion to the opening of the throttle valve, and it thus gives full control through the operation of the one lever to the necessary operative parts of the compressed air engine; and as only a small amount of air is required to induce the necessary air current through the interheater when the engine is running at slow speed, and for that purpose the main throttle valve is open for a relatively small distance and the air requiring reheating in the interheater is relatively small, it is evident that but a small amount of air is required to induce the current through the inter-heater. Full control is therefore given of the supply of the air to the air jet through the operation of the ordinary throttle valve lever, and when more power is needed and a greater amount of air required to operate the engines, in like manner the supply of air to the air jet is also increased while the closing of the throttle valve cuts off the entire supply to the air jet pipe, so that there is little or no waste of air for such purpose.

Fig. 4 illustrates a modification of the invention in which the draft through the interheater is induced by means of a fan. In such case the fan 30 is located within the tubular extension 31 of the inter-heater 32 and it is illustrated as driven by means of an air motor or air turbine which is shown diagrammatically at 33. In order to operate the said fan and so induce the current through the inter-heater I employ a like valve 34 of the same character as the air jet controlling valve 20 above described which controls the supply of air to the air motor 33 and this valve is operated in the same manner as above described in connection with the said air jet controlling valve 20, being located close to the main throttle lever shaft 35 which has the auxiliary arm 36 extending over the valve stem 37 of the valve so that by the movement of the main throttle lever the valve controlling the air to operate the fan is controlled in like manner and the speed of the air motor operating the fan is regulated according to the position of the throttle lever.

The general method of operating compressed air engines in which the air at high pressure is carried through one cylinder and thereby reduced below highest atmospheric temperature and the exhaust air pressure is reheated when confined by extended exposure to atmospheric temperature and then carried through a low pressure cylinder, and the specific methods in which exhaust air from the low pressure cylinder while still under pressure is discharged to induce a draft over the exposed surface of the interheating receptacle, are set forth and claimed in Letters Patent No. 953,334, granted to me March 29, 1910, upon application filed of even date with this application. The method of operating such compound compressed air engines, consisting in carrying the compressed air at high pressure through and expanding it within one cylinder and thereby reducing it below atmospheric temperature, confining such exhaust air from said cylinder within a receptacle and inducing over the exposed surface of such receptacle a violent current of air at atmospheric temperature sufficient to scour from or prevent the formation of frost on the exposed surfaces of said receptacle and thereby reheating and increasing the volume of such exhaust air and its capacity to generate power, carrying the reheated air through a low pressure cylinder, is included in Letters Patent No. 953,335, dated March 29, 1910, upon application filed of even date with this application.

In an application filed by me of even date herewith, Serial No. 501,640, is claimed the specific apparatus for producing a draft over the exposed surfaces of the interheater by means of a fan in a tubular extension in the end of the interheater and an independent air motor driving said fan.

What I claim is:

1. In compound compressed air engines, the combination of a high pressure engine, a low pressure engine and an inter-heater between them, a main throttle valve, means for inducing a current over the exposed surfaces of the inter-heater, a valve controlling the same and a lever controlling both the main throttle valve and the current inducing valve.

2. In compound compressed air engines, the combination of a high pressure engine, a low pressure engine, and an inter-heater between them, a main throttle valve, an air jet nozzle for inducing a current over the exposed surfaces of the inter-heater, an air jet valve feeding air under pressure to said nozzle, and a lever controlling both the throttle valve and the air jet valve.

3. In compound compressed air engines, the combination of a high pressure engine, a low pressure engine, and an inter-heater between them, a throttle valve and a throttle lever controlling the same, means operated by air under pressure for inducing a current over the exposed surfaces of the inter-heater, and a valve controlling the current inducing means located close to the throttle lever and operated thereby.

4. In compound compressed air engines, the combination of a high pressure engine, a low pressure engine, and an inter-heater between them, means operated by air under pressure for inducing a current over the exposed surfaces of the inter-heater, and a valve controlling said inducing means, a throttle valve, and a throttle lever connected to the throttle valve and having an auxiliary arm controlling the current inducing valve.

In testimony whereof, I the said CHARLES B. HODGES have hereunto set my hand.

CHARLES B. HODGES.

Witnesses:
 ROBERT C. TOTTEN,
 J. F. WILL.